(12) United States Patent
Flake

(10) Patent No.: US 7,370,230 B1
(45) Date of Patent: May 6, 2008

(54) METHODS AND STRUCTURE FOR ERROR CORRECTION IN A PROCESSOR PIPELINE

(75) Inventor: Lance Flake, Longmont, CO (US)

(73) Assignee: Maxtor Corporation, Longmont, CO (US)

(*) Notice: Subject to any disclaimer, the term of this patent is extended or adjusted under 35 U.S.C. 154(b) by 602 days.

(21) Appl. No.: 10/801,209

(22) Filed: Mar. 16, 2004

Related U.S. Application Data

(60) Provisional application No. 60/535,005, filed on Jan. 8, 2004.

(51) Int. Cl.
*G06F 11/00* (2006.01)

(52) U.S. Cl. ............................ 714/10; 714/42; 714/49; 714/819

(58) Field of Classification Search ................. 714/10, 714/42, 49, 819
See application file for complete search history.

(56) References Cited

U.S. PATENT DOCUMENTS

| | | | | |
|---|---|---|---|---|
| 5,604,753 A * | 2/1997 | Bauer et al. | ................. | 714/763 |
| 6,625,749 B1 * | 9/2003 | Quach | ................. | 714/10 |
| 6,658,621 B1 * | 12/2003 | Jamil et al. | ................. | 714/805 |
| 6,708,284 B2 * | 3/2004 | Smith | ................. | 714/10 |
| 6,785,847 B1 * | 8/2004 | Jordan et al. | ................. | 714/37 |
| 7,100,096 B2 * | 8/2006 | Webb et al. | ................. | 714/52 |

* cited by examiner

*Primary Examiner*—Yolanda L Wilson
(74) *Attorney, Agent, or Firm*—Westman, Champlin & Kelly, P.A.

(57) ABSTRACT

Methods and structures for an improved processor pipeline to eliminate the effect of correctable soft errors on processor/memory pipeline performance. Features and aspects hereof provide that the pipeline is extended by the addition of one or more information correction stages to correct a soft error using the fetched unit of information and the associated error correcting codes. By extending the pipeline, soft error correction does not stall the pipeline and hence system performance is improved in the face of soft errors from an error correcting memory subsystem.

29 Claims, 4 Drawing Sheets

| $T_0$ | $T_1$ | $T_2$ | $T_3$ | $T_4$ | $T_5$ | $T_6$ | $T_7$ |
|---|---|---|---|---|---|---|---|
| IR1 200 | IC1/ID1 202 | AA1 204 | DR1 206 | DC1 208 | EX1 210 | | |
| | IR2 220 | IC2/ID2 222 | AA2 224 | DR2 226 | DC2 228 | EX2 230 | |
| | | IR3 230 | IC3/ID3 232 | AA3 234 | DR3 236 | DC3 238 | EX3 240 |

Figure 2

| $T_0$ | $T_1$ | $T_2$ | $T_3$ | $T_4$ | $T_5$ | $T_6$ | $T_7$ | $T_8$ |
|---|---|---|---|---|---|---|---|---|
| IR1 300 | IC1 (start) 302 | IC1 (cont.) 304 | WC1 (dummy) 306 | EX1 308 | | | | |
| | | IR2 310 | IC2 (start) 312 | IC2 (cont.) 314 | WC2 (dummy) 316 | EX2 318 | | |
| | | | | IR3 320 | IC3 (start) 322 | IC3 (cont.) 324 | WC3 (dummy) 326 | EX3 328 |

Figure 3

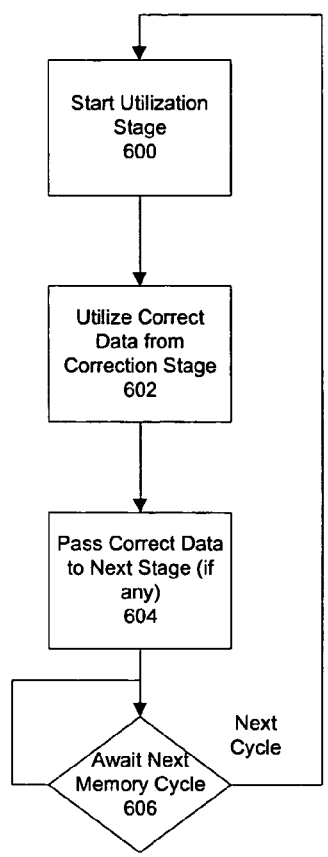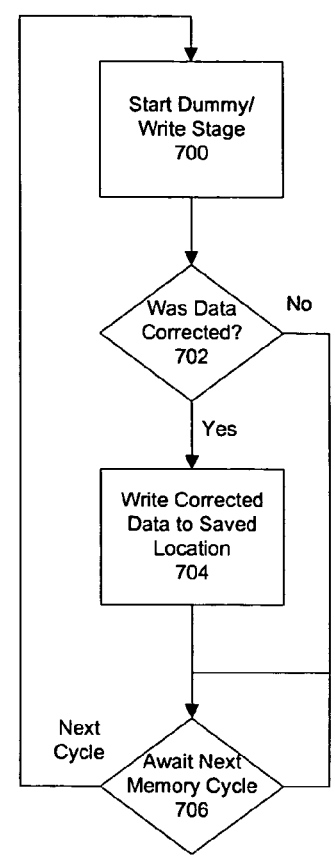
Figure 6
Figure 7

METHODS AND STRUCTURE FOR ERROR CORRECTION IN A PROCESSOR PIPELINE

BACKGROUND OF THE INVENTION

1. Field of the Invention

The present invention relates generally to pipelined processor operation in the presence of soft errors in memory and in particular relates to methods and structure for correcting soft errors found in information (program instructions and/or data) read from an attached memory subsystem.

2. Related Patents

This application claims the benefit of U.S. provisional patent application Ser. No. 60/535,005 filed on Jan. 8, 2004 which is hereby incorporated by reference.

3. Discussion of Related Art

It is common practice in present day computer processor architectures to utilize pipelined architectures for improving performance. In particular, present-day processors utilize pipelined architectures in accessing memory subsystems. Programmed instructions and data are fetched and/or read from a memory in a pipelined fashion so as to optimize processor performance in fetching and executing instructions.

In general, "pipelined architecture" refers to an architecture of, for example, a computing processor in which various stages of the instruction and/or data memory read operations are substantially independently operable and thus may be overlapped with other processing stages within the processor to decode instructions, determine addresses of operands, reading operand data from memory and execute the instructions. The particular stages of a pipeline and the degree of independence of the pipeline stages are matters of design choice for the processor designer. By so overlapping various stages of processor instruction fetching and execution and related data reading and decoding, the processor may most effectively utilize available bandwidth from the memory subsystem. In other words, a next memory read or fetch operation may be initiated a while later stages of a previous fetch or read continue to completion. The overlapped operations of the various stages of memory access allow a new memory access as often as every clock period of the memory subsystem. Such pipelined architectures are well known to those of ordinary skill in the processor and memory architecture arts.

Memory subsystems coupled to such pipelined processors are rapidly evolving as measured by both capacity and performance. As memory speeds and densities increase, so to does the susceptibility of such memories to "soft errors". A "soft error", in general, is one that may be corrected by applying error detection and correction techniques and circuits. Such a soft error may be manifested as, for example, a flipped bit. In other words, a bit value previously stored in memory as a zero value is flipped to a one value, or vice versa, or otherwise erroneously read back. Such errors are most commonly caused by radiation of various types and frequencies that interfere with the persistent storage of data in the memory semiconductor circuits.

Processors may encounter such soft errors during instruction fetch or data read operations. When soft errors are encountered in a pipelined processor architecture, the overlapped sequencing of the pipeline stages mat be stopped or disrupted (i.e., "stalled"). The pipeline stage may then need to be emptied and re-started to achieve the desired synchronization and overlap of stages of the memory interface pipeline. This stalling of the pipeline and the associated restarting thereof negatively impacts overall system performance.

However, the frequency of such soft errors is extremely rare as compared to the frequency of memory access due to the typical, error-free, pipelined instruction fetch and execution processes. Though somewhat infrequent, it remains an ongoing problem to reduce the frequency of encountering such soft errors or to correct them when detected.

One current solution to soft error problems in a memory subsystem is to add an error correcting code to all stored data and associated error detection and correction logic. Often such logic is embedded within the memory controller device used by the processor to interface with the memory subsystem. The error code is stored along with data written to the memory. When data is read from memory, the associated error code is also read and may be used to detect the presence of an error and to correct the error. For example, one common error detecting and correcting code utilizes a six bit Hamming code associated with each of stored 32 bit value in the memory subsystem. Such a six bit Hamming code is capable of detecting multiple bit errors in the corresponding 32 bit stored value and is further capable of correcting any single bit error in the corresponding 32 bit stored value. During a write operation in such an enhanced, error correcting memory subsystem, the processor writes a new 32 bit value to the memory subsystem and the error correction logic associated with the memory subsystem generates the corresponding six bit Hamming code such that a 38 bit value is then stored in the identified memory subsystem location (32 bit value supplied by the processor and six bit hamming code generated by the error correction features of the memory subsystem). During a read operation, the memory subsystem uses the retrieved 38 bits to produce a corrected 32 bit value even in the presence of any single bit error since the previous write operation.

However, such "in-line" correction typically slows the memory subsystem read performance for all memory accesses. In general, such error correcting techniques and logic add one or more "wait states" to every read or fetch operation. In view of the relative infrequency of such soft errors, imposing such a wait state penalty on every read or fetch operation is problematic and slows overall operation of the corresponding system.

Another presently known technique for reducing the frequency of soft errors is to provide a so called scrubbing engine. A scrubbing engine is an element operable as a background process that periodically reads each location in the memory, checks for errors using error correcting and detecting codes and techniques, and corrects any detected errors by writing the corrected value back to the memory location from which the read erroneous value was read. Such a scrubbing engine may impose one or more wait state delays on the memory subsystem performance but only when but the scrubbing engine detects an error and attempts to write a corrected value back to the memory subsystem. While the scrubbing engine architecture can improve performance over an in-line error correcting memory subsystem design, the scrubbing engine architecture does not eliminate all possible soft errors but merely reduces the probability or frequency of such soft errors arising.

Yet another present solution for reducing system performance impact due to soft errors in a memory subsystem suggests that an in-line error correcting memory subsystem architecture may overlap the correction error detection in correction logic with presentation of the fetched data to the requesting processor. If it is later determined that the value returned from the memory subsystem to the requesting processor included a correctable error, the memory subsystem may in some manner interrupt the processor to cause invocation of appropriate error handling procedures within the processor. For example, the processor may be interrupted and provided with a corrected memory data value. Processors adapted for such a memory architecture may receive the interrupt signal and restart execution of the instruction corresponding to the erroneously fetched information. While such a process eliminates the wait state penalty of the above discussed in-line error correcting memory architecture, the re-execution or restart sequencing, per se, is complicated and can impose significant design tradeoffs within the processor pipeline architecture. Specifically, the processor pipeline design is complicated due to the lateness of the error signal relative to the processor's fetching and execution of the earlier, erroneous instruction or data.

All presently known solutions for reducing or eliminating soft errors in a memory subsystem incur certain performance penalties or complexities in a processor pipeline design. In-line error detection and correction architectures may add wait states to all memory accesses and thereby impose a significant cost on all memory read operations (regardless of whether an error is detected or corrected). Imposing such wait state delays on all memory accesses significantly diminishes overall system performance despite the relative infrequency of memory soft errors.

Failure to correct detected soft errors in-line (i.e., in real time as they are fetched or read) may impose other performance obstacles in that the pipelined fetch/read operations may be stalled when an error is detected and/or corrected thereby requiring restart of the pipeline architecture. Such pipeline architecture stalls and restarts cause other performance problems in the overall system and add design complexities. A processor pipeline stall and restart generally entails emptying the pipeline of multiple instruction and data read operations in various stages and then restarting the fetch/read operations so purged from the pipeline.

It is evident from the above discussion that a need exists for improved memory subsystem and processor pipeline architectures that permit detection and correction of memory soft errors with minimal impact on processor and system performance.

SUMMARY OF THE INVENTION

The present invention solves the above and other problems, thereby advancing the state of the useful arts, by providing methods and structures for extending one or more stages of the processor pipeline to add one or more stages for error correction in memory reads/fetches. Where a typical memory read/fetch processor pipeline includes an instruction read and instruction decode stage, an additional instruction correction stage may be added to the pipeline stages in accordance with features and aspects hereof to permit correction of the read/fetched data prior to the decode operations. Similarly, other aspects and features hereof add a correction stage to the memory read/fetch pipeline for any associated data read portion of the memory operations. After data is read, another stage of the pipeline corrects it as needed prior to decoding the error-free data.

Adding pipeline stages does not impact overall system performance as much as prior techniques to assure in-line (real time) memory soft error detection and correction. Rather than adding delay as memory wait cycles that negatively impact all memory read operations or adding complexities that stall the processor pipeline, the added pipeline stages provide desired in-line memory correction with minimal negative impact on the processor and system performance.

A first feature hereof therefore provides a processor having a memory interface comprising: a multi-stage pipeline for fetching or reading information from a memory coupled to the processor, the pipeline including: a read stage to read a unit of information from the memory; a correction stage to correct a soft error detected in a read unit of information; and a utilization stage to utilize information in the corrected information.

Another aspect hereof further provides that the read stage comprises an instruction read stage to read a program instruction unit of information from the memory, wherein the correction stage comprises an instruction correction stage to correct a detected soft error in the read instruction, and wherein the utilization stage comprises an instruction decode stage to decode the corrected instruction unit of information.

Another aspect hereof further provides that the read stage comprises an instruction read stage to read a program instruction unit of information from the memory, wherein the correction stage comprises an instruction correction stage to correct a detected soft error in the read instruction, and wherein the utilization stage comprises an instruction execution stage to execute the corrected instruction unit of information.

Another aspect hereof further provides that the read stage comprises a data read stage to read a data unit of information from the memory, wherein the correction stage comprises a data correction stage to correct a detected soft error in the read data, and wherein the decode stage comprises a data decode stage to decode the corrected data unit of information.

Another aspect hereof further provides that the read stage is adapted to read a previously stored unit of information from the memory and an associated error correction code previously stored in the memory.

Another aspect hereof further provides that the previously stored unit of information is 32 bits and the previously stored error correction code is a 6 bit Hamming code.

Another aspect hereof further provides that the read stage and the correction stage are both operable within a single cycle of the attached memory.

Another aspect hereof further provides for control logic to enable and disable operation of the correction stage.

Another aspect hereof further provides for correction logic to write the corrected data back to the memory; and notification logic coupled to the correction logic to signal correction the correction logic that corrected data is available.

Another aspect hereof further provides that the notification logic includes: error storage for storing the address of the corrected data in the memory.

Another aspect hereof further provides that the error storage further includes: error data storage for storing the erroneous value read from the memory.

Another aspect hereof further provides that the multi-stage pipeline further comprises: a write correction stage to write corrected data back to the memory.

Another aspect hereof further provides that the correction logic is implemented as programmed instructions to be executed by the processor.

Another aspect hereof further provides that the notification logic is adapted to generate an interrupt signal in the processor and wherein the correction logic is executed in response to detection of the interrupt signal.

Another aspect hereof further provides that the correction stage is operable within a single cycle of the attached memory.

Another aspect hereof further provides that correction of a soft error requires more than a single cycle of the attached memory and wherein the pipeline further includes: multiple correction stages to correct a soft error detected in a read unit of information.

Another feature hereof provides a method for correcting soft errors in a pipelined processor coupled to a memory subsystem, the method comprising: reading a unit of information from an attached memory in a read stage of the processor pipeline; correcting a soft error in the read information in a correction stage of the processor pipeline; and utilizing the corrected information in a utilization stage of the processor pipeline.

Another aspect hereof further provides that the step of correcting comprises: correcting the read information in multiple correction stages of the processor pipeline.

Another aspect hereof further provides that the steps of correcting and utilizing are performed within a single memory cycle of an attached memory system.

Another aspect hereof further provides for selectively disabling operation of the correction stage.

Another aspect hereof further provides for storing information regarding a soft error corrected in the step of correcting.

Another aspect hereof further provides that the step of storing comprises: saving an address value of the location that provided the corrected soft error.

Another aspect hereof further provides that the step of storing further comprises: saving an erroneous data value that provided the corrected soft error.

Another aspect hereof further provides for notifying the processor that a soft error was corrected.

Another aspect hereof further provides for executing instructions in the processor to write the corrected information into the memory.

Another aspect hereof further provides that the step of notifying comprises: interrupting the processor to signal correction of a soft error.

Another aspect hereof further provides for writing the corrected information to the memory in a write corrected information stage of the processor pipeline.

BRIEF DESCRIPTION OF THE DRAWINGS

FIG. 2 is a diagram depicting an exemplary pipeline organization and chronological sequence for an exemplary multi-stage processor pipeline enhanced in accordance with features and aspects hereof.

FIG. 3 is another diagram depicting an exemplary pipeline organization and chronological sequence for an exemplary multi-stage processor pipeline enhanced in accordance with features and aspects hereof.

FIG. 6 is a flowchart describing operation of an exemplary utilization pipeline stage in accordance with features and aspects hereof.

FIG. 7 is a flowchart describing operation of a write corrected information pipeline stage in accordance with features and aspects hereof.

DETAILED DESCRIPTION OF THE DRAWINGS

Figure 1:
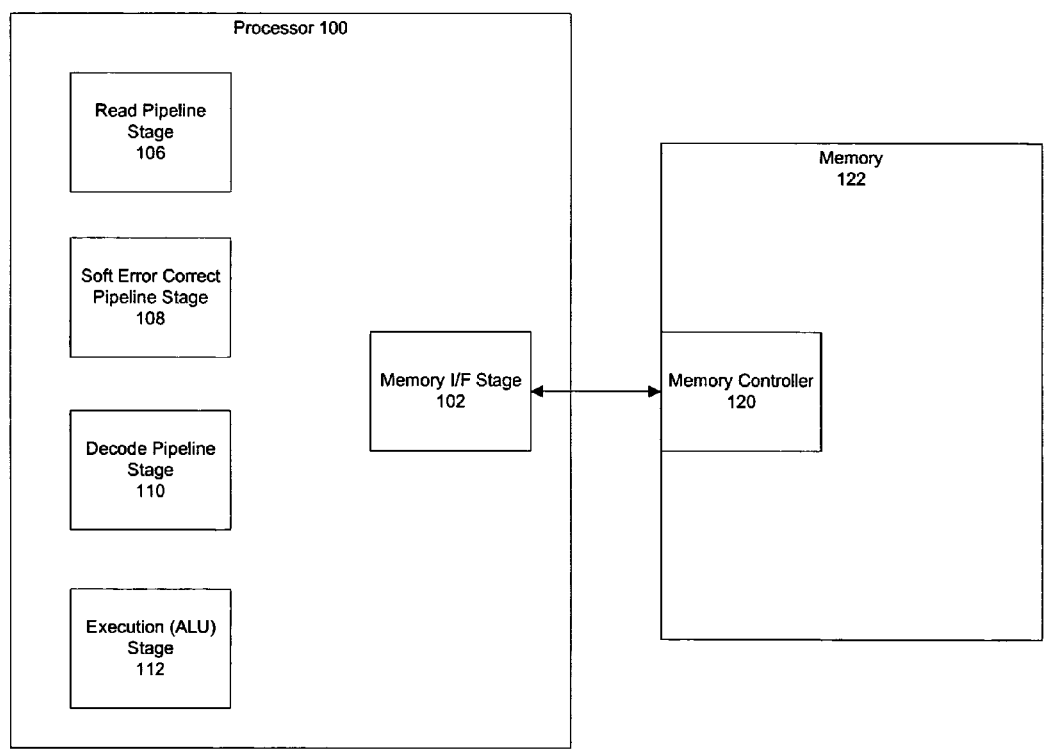
FIG. 1 is a block diagram of a system including a processor enhanced with pipeline error correction features and aspects hereof.

FIG. 1 is a block diagram of a system including processor 100 enhanced in accordance with pipelined memory error correction features and aspects hereof. Processor 100 is coupled to memory 122 for storing and retrieving data and program instructions to be utilized and executed by processor 100. Typically, memory 122 is coupled directly to a memory controller 120 that is, in turn, coupled to a memory interface 102 within processor 100. Those of ordinary skill in the art will now readily recognize numerous equivalent architectures for coupling memory 122 to processor 100 such that memory interface 102 and memory controller 120 may be distinct components, or may be integrated in a single component and/or may reside within processor 100 or may be external to the processor 100. Such design choices are now well known to those of ordinary skill in the art.

Processor 100 is typically coupled through the memory interface 102 to fetch (i.e., read) program instructions and related data from memory 122. The fetched instructions are then decoded as appropriate to the particular processor architecture and executed along with any data potentially required for the instruction. The required data (i.e., operands of the decoded instruction) are also read or fetched from memory 122.

Those of ordinary skill in the art will now recognize that memory 122 (and associated memory controller 120) may represent any memory element useful for storing program instructions and associated data for execution by processor 100. For example, memory 122 may be a first or second level cache memory useful for highest performance instruction execution. Further, memory 122 may be an external random access memory (i.e., RAM, DRAM, SDRAM, VRAM, etc.). Further, those of ordinary skill in the art will now recognize that memory 122 (and associated memory controller 120) may be implemented as distinct components external to processor 100 (as shown in FIG. 1) or, as a matter of design choice, may be integrated within the circuit die pattern of processor 100 or within a multi-chip module design or any other level of integration appropriate to the particular application of processor 100.

As noted above, high performance processors typically include pipelined architectures for memory interfacing. A pipelined architecture, in essence, comprises a plurality of substantially independently operable stages within processor 100 used for fetching, decoding and executing program instructions and associated operand data. Such separate, substantially independent stages may be concurrently operable within processor 100 to thereby permit more rapid fetching and execution of program instructions from memory 122. As a first portion of a memory read/fetch operation is being performed, later stages to decode and execute a previously fetched instruction may overlap the reading of a new instruction. Thus, a pipelined architecture, depending on numerous design choices, may permit fetching and execution of a new instruction on essentially each clock cycle of the memory.

As shown in FIG. 1, processor 100 includes three exemplary stages for reading/fetching program instructions, correcting soft errors detected in the instructions, and decoding the instructions and parameters from the corrected data read from memory. Such a decoded instruction may then be executed by a fourth execution (ALU) stage 112. The exemplary pipeline design depicted in FIG. 1 includes read pipeline stage 106 operable to read or fetch program instructions or program operand data (more generally referred to herein as information or units of information) from a specified location of memory 122. As discussed further herein below, read pipeline stage 106 may preferably read a unit of information representing a program instruction or other operand data along with a corresponding error correcting and detecting code. In one aspect hereof, the unit of information so read may comprise a 32 bit data or instruction word and the error correcting code may comprise a 6 bit Hamming code. Those of ordinary skill in the art will now recognize that the unit of information read by pipeline stage 106 may be of any appropriate size useful in the particular application of processor 100. Similarly, the error correcting code may be any size or type of error correcting information useful for detecting and correcting errors in the associated unit of information read from memory 122.

Read pipeline stage 106 applies the retrieved unit of information and associated error correction code to the soft error correction pipeline stage 108. Error correction pipeline stage 108 utilizes the error correcting code to detect the presence of an error in the unit of information read by pipeline stage. The error correcting code may be used by the correction pipeline stage to correct any detected error. The unit of information so read by read stage 106 and corrected by correction stage 108 may then be applied to a decode pipeline stage 110. Decode pipeline stage 110 is operable to parse the corrected instruction/data information retrieved and corrected by stages 106 and 108 to decode the information to extract details regarding the particular instruction to be executed. Having so decoded an instruction and any associated operand data, execution (ALU) stage 112 is then operable to execute the corrected instruction and data information. ALU 112 is therefore a final stage of the simplified pipeline of processor 100 in that on each clock cycle of memory 122, ALU 112 receives another fetched and corrected program instruction (and associated operand data) from the pipelined memory architecture of processor 100.

As noted above, pipeline stages 106 through 112 may be substantially, concurrently operable the such that the various stages may overlap one another in the continual, sequential fetching and decoding of instructions and associated data operands. By overlapping operation of the various pipeline stages, processor 100 the may beneficially retrieve, decode, correct, and execute one instruction for essentially each memory cycle of memory 122 even in the presence of detected soft errors in the sequence of instruction and data fetches. In other words, on each memory cycle, read pipeline stage 106 is retrieving a next instruction or operand, soft error correction pipeline states 108 is correcting an instruction or operand fetched on the previous memory cycle, decode pipeline stage 110 is correcting decoded instruction or operand data retrieved and corrected in a previous memory cycle, and lastly, ALU stage 112 executes an instruction previously decoded, corrected, and read in previous memory cycles. Since each stage of the pipeline may be concurrently operable in each cycle of memory 122, ALU 112 may execute an instruction essentially on each memory cycle.

Soft errors will not disrupt the normal sequencing of the pipeline stages and hence will not impact performance of the processor 100. Only execution branches, as well known in the art, will disrupt efficient sequencing of the pipeline. The extension of the pipeline as previously practiced to include soft error correction pipeline stage 108 in processor 100 therefore enhances the performance of processor 100 by reducing or eliminating stalls of the pipeline architecture in response to detection and correction of a soft error. Where previous techniques would incur processor overhead by stalling the pipeline architecture and then emptying and restarting the pipeline architecture, inclusion of the error correction pipeline stage 108 in accordance with features and aspects hereof eliminates the need to stall and restart the pipeline architecture within processor 100.

The particular collection and sequence of pipeline stages shown in FIG. 1 are now a matter of design choice for those of ordinary skill in the art. Depending on the nature of instructions and associated operand data executed by a particular processor 100, more or fewer pipeline stages may be useful within the processor. For example, if processor instructions include operand data to be read separately from instruction information retrieved from memory 122, additional pipeline stages may be provided to retrieve any required operand/parameter information associated with execution of a previously fetched instruction. For example, some processors include instruction formats that always include a number of additional units of information such that the number of additional units to be read is determinable from the first unit of information read. Other particular selections of pipeline stages are discussed further herein below with regard to FIGS. 2 through 7. FIG. 1 is therefore merely intended as an example of one possible embodiment of features and aspects hereof (simplified for presentation herein) to provide soft error correction as a stage in the pipeline processing between a processor 100 memory 122.

FIG. 2 is a diagram describing processing of a multi-stage pipeline providing in-line soft error detection and correction as a part of a processor's pipeline processing. As shown in FIG. 2, an exemplary pipeline architecture includes seven stages operable to fetch program instructions and associated operand data for execution by the associated processor in an execution stage. The stages are denoted as follows: IR (instruction read stage), IC (instruction soft error correction stage), ID (instruction decode stage), AA (address computation stage for operand data), DR (data operand read stage), DC (data operand soft error correction stage), and EX (instruction execution stage). Each stage as depicted in FIG. 2 is shown as operable within a particular memory cycle denoted as Tn where n is a memory cycle index number. FIG. 2 shows an example with eight memory cycles (T0 through T7).

At memory cycle T0, the instruction read stage is first operable (IR1 200). The instruction so read from and associated memory (along with error correction information also read from memory) is then applied to the next stage of the pipeline at memory cycle T1. At memory cycle T1, the instruction correction stage and instruction decode stage are both operable (IC1/ID1 202). In one aspect hereof, where two stages may operate quickly enough to both complete sequentially within a single memory cycle, the stages may be integrated sequentially within a single memory cycle. For example, the additional error correction stage IC1 may be integrated with an existing decode stage ID1. IC1/ID1 202 therefore shows the instruction correction stage and instruction decode stage both operable within memory cycle T1 in response to the instruction read by IR1 200.

The pipelined architecture described by FIG. 2 also shows the instruction read stage (IR2 220) activating again at memory cycle T1 to commence reading of the next instruction (and associated error correction information.). Therefore, a second operation may be performed by the instruction read stage substantially concurrently with the soft error correction and instruction decode stage (IC1/ID1 202) both operable at memory cycle T1.

At memory cycle T2, the address computation pipeline stage (AA 204) is operable to determine an address for a data operand associated with the instruction previously read, corrected and decoded. Simultaneously, instruction correction and decode stages (IC2/ID2 222) may be operable to correct and decode information read by the instruction are read stage previously at IR2 220. Further, at memory cycle T2, the instruction read stage (IR3 230) may operate again to commence reading of yet another instruction unit of information.

At memory cycle T3, the data read stage (DR1 206) is operable to read operand data associated using the operand address previously determined by AA 204. In like manner address computation stage AA 224 may be again operable to determine a data operand addresses for the instruction previously read, corrected and decoded by IR2 220 and IC2/ID2 224. Simultaneously, instruction correction and decode stages IC3/ID3 232 may be operable to correct and decode the newest instruction previously read by IR3 230.

Those of ordinary skill in the art will now recognize that still further instruction read stage operations (i.e., IR4, IR5, ... ) may be commenced at memory cycles T3 through T7. For simplicity of FIG. 2 and the description thereof, additional instruction fetch decode and operand read and decode sequences of the pipeline stages need not be shown but will now be readily apparent to those of ordinary skill in the art.

Memory cycle T4 shows the correction of data (DC1 208) previously read from stage DR1 206. Further, a next data are read stage operation is commenced in memory cycle T4 (DR2 226). Lastly, at cycle T4, another address computation pipeline stage operation is commenced (AA 234) to determine data operand address information from the instruction previously corrected and decoded values of IC3/ID3 232.

Memory cycle T5 shows the final execution stage EX1 210 for executing the instruction originally fetched at IR1 200 in memory cycle T0. The execution stage executes the instruction fetched and corrected along with data operands fetched and corrected by the earlier pipeline stages 200 through 208 thus completing a pipelined instruction fetch and execution for a single instruction. Also in memory cycle T5, the second sequence of pipeline stages continues with correction of previously read data operands (DC2 228) and reading of yet another data operand (DR3 236). Memory cycles T6 and T7 show remaining pipeline stages for completion of the second and third instruction fetch and execution pipeline sequences described above. In particular the execution stage EX2 230 completes execution of instruction and data operands fetched and corrected by operation of stages 220 through 228. In like manner, data correction stage DC3 238 and execution stage EX3 240 complete the pipeline stage operations for the third instruction and data operand fetched by stages 230 through 236.

As noted above, those of ordinary skill in the art will now recognize that the sequence of staged pipeline operations represented by FIG. 2 may continue operation for any number of subsequent memory cycles to continually fetch, correct and decode instructions and associated data operands. By inserting soft error correction stages, the pipeline sequence need not stall in response to detecting a soft error in a unit of information read from the associated memory. Rather, extension of the instruction fetch and execution pipeline to include stages for correcting units of information read from memory alleviates the need for stalling and restarting the pipeline in response to detection of such soft errors.

Further, those of ordinary skill in the art will now recognize that the additional correction stages (ICn and DCn) may be integrated with a subsequent stage (e.g., ICn integrated with IDn) as shown or may be the implemented as distinct, separate stages (e.g., DCn as distinct from EXn). Such a design choice would depend on the particular stages and sequence of stages in a particular processor design. Such designed choices are now well known to those of ordinary skill in the art.

FIG. 3 shows another exemplary sequence of pipeline stages in a possible exemplary pipeline design enhanced with soft error correction features and aspects hereof. The pipeline of FIG. 3 is simplified to show another optional feature in accordance with features and aspects hereof. The exemplary pipeline design described in FIG. 3 shows a correction stage (ICn) that requires sufficient time such that it exceeds one memory cycle time and therefore may spread over two memory cycles. Another aspect shown in FIG. 3 is represented as an additional stage for writing corrected data back to the memory from which an erroneous unit of information was read. A WCn (write corrected information) stage is shown in FIG. 3 for providing such a write back feature. Such a feature may be operable when a soft error is detected and corrected by earlier stages (i.e., by the ICn stage preceding the WCn stage).

In particular, as shown in FIG. 3, the pipeline architecture includes four stages: IR (instruction read), IC (instruction correction to detect and correct soft errors), WC (to write back corrected instructions to the memory—if any), and EXn (to execute the corrected instruction). A first sequence of pipeline stage operations is shown as stage operations of 300 through 308 operable in memory cycles T0 through T4. A second sequence of the pipeline stage operations is shown as stages 310 through 318 operable during memory cycles T2 through T6 and a third sequence of the pipeline operation is shown as stages 320 through 328 operable in memory cycles T4 through T8.

As noted above, the exemplary pipeline structure and sequence described by FIG. 3 differs from that of FIG. 2 in that no data reading stages are shown, the instruction correction stage stretches over two memory cycles, and an additional write corrected data stage is added to the sequence. This particular exemplary sequence of stages is not intended to represent any particular application but rather intended merely to indicate a variety of possible applications of features and aspects hereof wherein additional stages are added to a processor pipeline sequence to permit correction of soft errors detected in program instruction and operand reads from an associated memory. Those of ordinary skill in the art will therefore now readily recognize various combinations of sequences of pipeline stages to accomplish particular desired goals for a particular processor architecture application. Features and aspects hereof provide that the pipeline stages include stages associated with detection and/or correction of soft errors as well as, optionally, writing the corrected units of information back to the associated memory. Further, those of ordinary skill in the art will now recognize options for combining the correction related stages with other subsequent stages where the combination of two or more such sequential stages may be performed within a single memory cycle time. As noted above with respect to FIG. 2, soft error correction stages may be combined with subsequent decode pipeline stages. In addition, as shown in FIG. 3, an additional write corrected information stage could be combined with a subsequent execution or decode stage. Design choices for the particular selection and combination of pipeline stage are now well known to those of ordinary skill in the art as required for a particular application of the enhanced processor features and aspects hereof.

FIGS. 2 and 3 are therefore intended merely as exemplary of possible pipeline architectures and sequences embodying features and aspects hereof. Numerous other pipeline architectures and stage sequences will now be readily apparent to those of ordinary skill and the art such that soft error correction and write back features may be added to the pipeline stages and sequence.

Figures 4, 5:
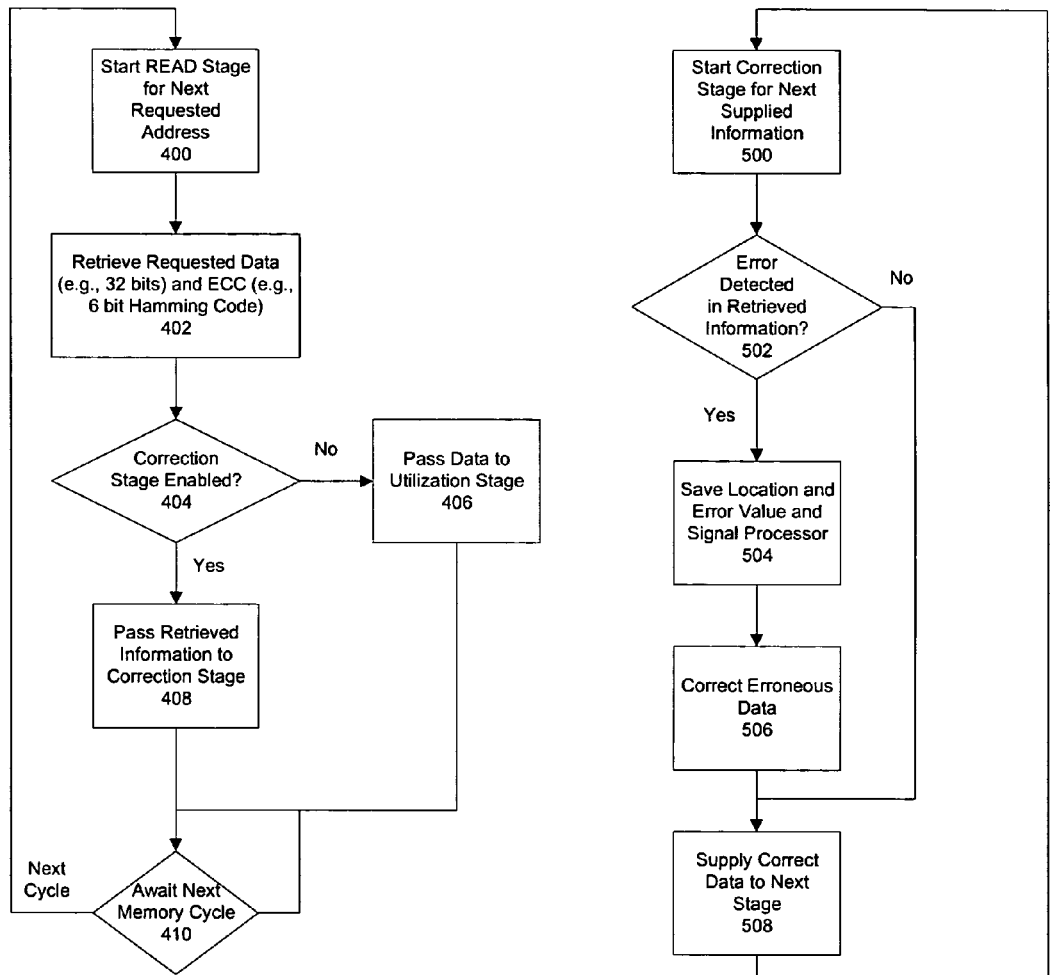
FIG. 4 is a flowchart describing operation of an exemplary read pipeline stage in accordance with features and aspects hereof.
FIG. 5 is a flowchart describing operation of an exemplary information correction pipeline stage in accordance with features and aspects hereof.

FIG. 4 is a flowchart describing operation of a read pipeline stage in accordance with features and aspects hereof. Element 400 is operable to initiate operation of half the read pipeline stage for a next requested location of information in the associated memory. Element 402 is then operable to retrieve the requested unit of information (e.g., 32 bits of data) and the associated error correcting code (e.g., a 6 bit Hamming code stored in association with the corresponding data). Element 404 is then operable to determine whether the additional soft error correction stage is presently enabled for operation. As noted above, the additional correction stages in accordance with features and aspects hereof, may be dynamically and selectively enabled and disabled by control features associated herewith. For example, a single processor enhanced in accordance with features and aspects hereof may be used with various types of memory within different system designs or even within a single system design. Depending on the type of memory being addressed and the availability in that memory of error correcting code information, the error correction pipeline stages associated with features and aspects hereof may be selectively enabled and disabled.

If element 404 determines that the correction stage features are presently disabled, element 406 is operable to pass the retrieved data to a next pipeline stage for appropriate utilization. Depending on the structure of a particular pipeline architecture and application thereof, the next stage may be an instruction decode stage, a data operand decode stage, an address computation stage, an execution stage, or any other stage of a pipeline appropriate to a particular processor application and design. Processing of the presently operating read pipeline stage thereby completes and element 410 is next operable to await occurrence of the next memory cycle. Upon such detection of the next memory cycle, the read stage begins processing anew with element 400 as discussed above. If element 404 determines that the correction stage processing is presently enabled, element 408 is next operable to pass the retrieved information to an appropriate correction stage of the pipeline. As noted above a next correction stage may be an instruction correction stage, a data operand correction stage, or any other stage operable in accordance with features and aspects hereof to correct a previously read unit of the information in accordance with associated error correcting codes. Element 410 is then operable as noted above to continue operation of the read stage processing upon detection of the next memory cycle.

FIG. 5 is a flowchart describing operation of an exemplary correction pipeline stage in accordance with features and aspects hereof operable to correct a previously read unit of information according to error correction codes associated with the previously read unit of information. Element 500 is first operable to commence operation of the correction stage to correct a unit of information supplied from a previous pipeline stage (e.g., a read stage such as that described in FIG. 4). Element 502 is then operable to detect whether any error is present in the supplied unit of information. If not, processing continues at element 508 as discussed further herein below to supply the correct data to the next stage of the pipeline.

If element 502 determines that a soft error has been detected in the supplied unit of information, element 504 is optionally operable to save information regarding the detected soft error. As noted above, optional features and aspects hereof may record information regarding the detected and corrected soft error so that other features and aspects of the processor architecture may perform further processing associated with the detected error. For example, element 504 may save information regarding the location of the unit of information that generated the soft error as well as the erroneous value read from memory at that location. Any other information useful for a processor to permanently correct such an error or to log statistical information regarding such errors may be similarly recorded by operation of the element 504. Such information may be stored in registers associated with the pipeline architecture of the processor or any other form of memory or storage accessible by elements of the processor.

FIG. 6 is a flowchart describing operation of an exemplary utilization stage in accordance with processor pipeline features and aspects hereof. As noted above, features and aspects hereof provide for improvement of a processor pipeline architecture by inserting one or more correction stages in a processor pipeline coupled to error correcting memory. In general, each error correcting stage follows a preceding read or fetch stage operation of the processor pipeline and is followed by some utilization stage to utilize the retrieved and corrected unit of information.

As used herein, "utilization stage" refers to any stage that follows a correction stage of the enhanced pipeline to further utilize the read/fetched and corrected unit of information. For example, a utilization stage may include an execution stage or a decode stage for decoding instruction or operand information from a retrieved unit of information. A utilization stage may also include an address computation stage as an aspect of instruction decoding for determining an operand address associated with the decoded instruction.

Element 600 is therefore first operable to initiate operation of the utilization stage in response to provision of corrected information from an earlier data, instruction or other correction pipeline stage (e.g., the correction stage described in FIG. 5 above). Element 602 then represents appropriate processing of the utilization stage to utilize the corrected data received from the preceding correction pipeline stage. Details of the utilization are specific to a particular utilization stage as discussed and includes any processing appropriate to the particular utilization feature. For example, operand address computations may be performed, instruction decoding may be performed, operand decoding may be performed, instruction execution may be performed, etc., by the utilization processing of element 602.

Element 604 then passes the corrected and the utilized data to a next pipeline stage (if any). As noted above, numerous arrangements of pipeline stages appropriate to particular processor applications will now be readily apparent to those of ordinary skill in the art. The additional stages may follow the utilization stage described here in FIG. 6 or, in the alternative, no additional pipeline stages may be required for a particular processor pipeline architecture. Lastly, element 606 awaits detection of a next memory cycle to begin a next operation of the utilization pipeline stage. Upon detection of such a next memory cycle, the process continues by returning to element 600 to again start operation of utilization pipeline stage.

FIG. 7 is a flowchart describing operation of an exemplary write correction pipeline stage in accordance with features and aspects hereof. As noted above, an aspect hereof provides that the extended pipeline architecture includes an additional pipeline stage to write the corrected unit of information back to the memory location from which it was erroneously read. As noted above with respect to FIG. 5, such correction may be performed by programmed instructions accessing saved information regarding the data correction performed. FIG. 7 therefore provides another aspect hereof wherein corrected data may be recorded in the associated memory by operation of yet another extended stage of the pipeline. Further, those of ordinary skill in the art will now recognize that the feature expressed in FIG. 7 for writing corrected information back to the associated memory may be integrated within the error correction stage assuming time permits such an operation to be performed along with the error correction computations. Such design choices are now readily apparent to those of ordinary skill in the art.

Element 700 is first operable to start or restart operation of the write correction pipeline stage who the period. This correction write back feature is optional depending on whether an error correction was made in an earlier pipeline stage and whether other software/firmware features of the processor are implemented to permanently correct detected soft errors. Element 702 therefore determines whether a correction was made by operation of an earlier correction pipeline stage. If not, processing continues with element 706 as discussed below to await a next memory cycle. If element 702 determines that a soft error was corrected by operation of an earlier error correction stage, element 704 is then operable to write the corrected unit of information back to the location from which it was erroneously read. As noted above with respect to FIG. 5, the location from which the erroneous unit of information was read may be stored in registers or other memory devices associated with the processor pipeline. Further, any other useful attributes of the prior correction operation may be stored in such registers or memory elements associated with the processor pipeline. Element 706 then awaits detection of the next memory cycle to start a next operation of the write correction pipeline stage.

Those of ordinary skill in the art will now recognize a wide variety of programmable logic features for implementing the optional aspects of the write correction pipeline stage described in FIG. 7. For example, operation of an earlier correction stage to actually correct the detected soft error may set a flag value in a logic latch, or a register, or any other memory element associated with the processor pipeline. The value of such a flag may be utilized by operation of element 702 as discussed above to detect occurrence of an earlier soft error correction. Those of ordinary skill in the art will now recognize a wide variety of capabilities for synchronizing the setting and resetting of such a flag value in a latch, register or other memory element. Further, those of ordinary skill in the art will also now recognize the need, if any, for multiple such flags to coordinate overlapped operation of multiple pipeline stages. Such design choices are now readily apparent to those of ordinary skill in the art.

Those of ordinary skill in the art will also now recognize that the exemplary operation of enhanced pipeline stages described above with respect to FIGS. 4 through 7 are merely intended as exemplary of typical pipeline stage operations. Details of implementation such as communicating information from one stage to a next pipeline stage will now be readily apparent to those of ordinary skill in the art and may include implementations such as use of multiple registers or latches as typical memory elements for communicating between pipeline stages. Numerous equivalent implementations of the operation of the depicted exemplary pipeline stages of FIGS. 4 through 7 will now be readily apparent to those of ordinary skill in the art. Further, operation of additional, enhanced pipeline stages to provide in-line error detection and correction to reduce or eliminate the impact of soft errors on processor pipeline performance will now be readily apparent to those of ordinary skill in the art in view of the above discussions.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A processor having a memory interface comprising:
   a multi-stage pipeline for fetching or reading information from a memory coupled to the processor, the pipeline including:
   a read stage to read a unit of information from the memory;
   a correction stage to correct a soft error detected in a read unit of information; and
   a utilization stage to utilize information in the corrected information.

2. The processor of claim 1
   wherein the read stage comprises an instruction read stage to read a program instruction unit of information from the memory,
   wherein the correction stage comprises an instruction correction stage to correct a detected soft error in the read instruction, and
   wherein the utilization stage comprises an instruction decode stage to decode the corrected instruction unit of information.

3. The processor of claim 1
   wherein the read stage comprises an instruction read stage to read a program instruction unit of information from the memory,
   wherein the correction stage comprises an instruction correction stage to correct a detected soft error in the read instruction, and
   wherein the utilization stage comprises an instruction execution stage to execute the corrected instruction unit of information.

4. The processor of claim 1
   wherein the read stage comprises a data read stage to read a data unit of information from the memory,
   wherein the correction stage comprises a data correction stage to correct a detected soft error in the read data, and
   wherein the decode stage comprises a data decode stage to decode the corrected data unit of information.

5. The processor of claim 1 wherein the read stage is adapted to read a previously stored unit of information from the memory and an associated error correction code previously stored in the memory.

6. The processor of claim 5 wherein the previously stored unit of information is 32 bits and the previously stored error correction code is a 6 bit Hamming code.

7. The processor of claim 1 wherein the read stage and the correction stage are both operable within a single cycle of the attached memory.

8. The processor of claim 1 further comprising:
control logic to enable and disable operation of the correction stage.

9. The processor of claim 1 further comprising:
correction logic to write the corrected data back to the memory; and
notification logic coupled to the correction logic to signal correction the correction logic that corrected data is available.

10. The processor of claim 9 wherein the notification logic includes:
error storage for storing the address of the corrected data in the memory.

11. The processor of claim 10 wherein the error storage further includes:
error data storage for storing the erroneous value read from the memory.

12. The processor of claim 9 wherein the correction logic is implemented as programmed instructions to be executed by the processor.

13. The processor of claim 12 wherein the notification logic is adapted to generate an interrupt signal in the processor and wherein the correction logic is executed in response to detection of the interrupt signal.

14. The processor of claim 1 wherein the multi-stage pipeline further comprises:
a write correction stage to write corrected data back to the memory.

15. The processor of claim 1 wherein the correction stage is operable within a single cycle of the attached memory.

16. The processor of claim 1 wherein correction of a soft error requires more than a single cycle of the attached memory and wherein the pipeline further includes:
multiple correction stages to correct a soft error detected in a read unit of information.

17. A method for correcting soft errors in a pipelined processor coupled to a memory subsystem, the method comprising:
reading a unit of information from an attached memory in a read stage of the processor pipeline;
correcting a soft error in the read information in a correction stage of the processor pipeline; and
utilizing the corrected information in a utilization stage of the processor pipeline.

18. The method of claim 17 wherein the step of correcting comprises:
correcting the read information in multiple correction stages of the processor pipeline.

19. The method of claim 17 wherein the steps of correcting and utilizing are performed within a single memory cycle of an attached memory system.

20. The method of claim 17 further comprising:
selectively disabling operation of the correction stage.

21. The method of claim 17 wherein the step of reading comprises:
reading a unit of data; and
reading a corresponding error correcting code previously stored with the unit of data.

22. The method of claim 21
wherein the step of reading a unit of data comprises reading a 32 bit data value, and
wherein the step of reading a corresponding error correcting code comprises reading a 6 bit Hamming code.

23. The method of claim 17 further comprising:
storing information regarding a soft error corrected in the step of correcting.

24. The method of claim 23 wherein the step of storing comprises:
saving an address value of the location that provided the corrected soft error.

25. The method of claim 24 wherein the step of storing further comprises:
saving an erroneous data value that provided the corrected soft error.

26. The method of claim 17 further comprising:
notifying the processor that a soft error was corrected.

27. The method of claim 26 further comprising:
executing instructions in the processor to write the corrected information into the memory.

28. The method of claim 26 wherein the step of notifying comprises:
interrupting the processor to signal correction of a soft error.

29. The method of claim 17 further comprising:
writing the corrected information to the memory in a write corrected information stage of the processor pipeline.

* * * * *